(12) United States Patent
Tyni et al.

(10) Patent No.: US 7,937,283 B2
(45) Date of Patent: May 3, 2011

(54) METHOD FOR OPTIMIZING A MAINTENANCE PROGRAM

(75) Inventors: Tapio Tyni, Hyvinkää (FI); Olli Orrainen, Hyvinkää (FI)

(73) Assignee: Kone Corporation, Helsinki (FI)

( * ) Notice: Subject to any disclaimer, the term of this patent is extended or adjusted under 35 U.S.C. 154(b) by 510 days.

(21) Appl. No.: 12/155,670

(22) Filed: Jun. 6, 2008

(65) Prior Publication Data

US 2008/0319821 A1    Dec. 25, 2008

Related U.S. Application Data

(63) Continuation of application No. PCT/FI2006/000369, filed on Nov. 13, 2006.

(30) Foreign Application Priority Data

Dec. 16, 2005 (FI) .................................. 20051291

(51) Int. Cl.
*G06F 9/44* (2006.01)
(52) U.S. Cl. .......................................................... 705/7
(58) Field of Classification Search ................. 705/7
See application file for complete search history.

(56) References Cited

U.S. PATENT DOCUMENTS

| 5,111,391 | A | 5/1992 | Fields et al. | |
| 5,737,728 | A * | 4/1998 | Sisley et al. | 705/8 |
| 5,913,201 | A | 6/1999 | Kocur | |
| 6,330,935 | B1 | 12/2001 | Systermans et al. | |
| 7,346,531 | B2 * | 3/2008 | Jacobs | 705/8 |
| 2004/0162811 | A1 * | 8/2004 | Wetzer et al. | 707/2 |
| 2005/0015504 | A1 * | 1/2005 | Dorne et al. | 709/229 |
| 2006/0253311 | A1 | 11/2006 | Yin et al. | |

FOREIGN PATENT DOCUMENTS

| EP | 1087311 A2 | 3/2001 |
| WO | WO-00/75841 A1 | 12/2000 |

OTHER PUBLICATIONS

Blakeley, Fred; Bozkaya, Burcin; Cao, Buyang; Hall, Wolfgang; Knolmajer, Joseph; "Optimizing Periodic Maintenance Operations for Schindler Elevator Corporation". Jan.-Feb. 2003. vol. 33, No. 1. pp. 67-79.*
Bretthauer G., et. al.., Integrated maintenance scheduling system for electrical energy systems, IEEE Transactions on Power Delivery, vol. 13, No. 2, huhtikuu 1998, s. 655-660. A. Sittithumwat, 'Optimal Allocation of Distribution Maintenance Resources with Limited Information', Journal of Electric Power Systems Research, vol. 68, Issue 3, Mar. 2004, pp. 208-220, whole document.
K. Nikolopoulos, et al., 'Integrating industrial maintenance strategy into ERP', Industrial Management & Data Systems 103/3 (2003), pp. 184-191, whole document.
N. M. Paz, et al., 'Maintenance scheduling: issues, results and research needs', International Journal of Operations and Production Management 14, 8 (1994), pp. 47-69, whole document; pp. 48 and 56, in particular.
Khoong et al., Int. Trans. Opl Res. vol. 1. No. 3, pp. 353-361. 1994.

* cited by examiner

*Primary Examiner* — Peter Choi
(74) *Attorney, Agent, or Firm* — Birch, Stewart, Kolasch & Birch, LLP

(57) ABSTRACT

The present invention discloses a method and a computer program for optimizing the implementation of a maintenance program for maintenance units. In the method of the invention, an estimated duration is determined for each maintenance module, a periodic working capacity is determined for each serviceman carrying out maintenance programs and location data is determined for each maintenance unit. Further the invention comprises optimizing the maintenance work comprised in the maintenance modules for each serviceman in such manner that the unbalance between the working capacity of the serviceman and the amount of maintenance work required by the maintenance units belonging to the maintenance domain attended to by the serviceman is minimized and the required traveling from a maintenance unit to another is minimized, so that the number of maintenance modules located in the vicinity of each maintenance module is maximized.

6 Claims, 6 Drawing Sheets

Prior art

METHOD FOR OPTIMIZING A MAINTENANCE PROGRAM

This application is a Continuation of copending PCT International Application No. PCT/FI2006/000369 filed on Nov. 13, 2006, which designated the United States, and on which priority is claimed under 35 U.S.C. §120. This application also claims priority under 35 U.S.C. §119(a) on Patent Application No(s). 20051291 filed in Finland on Dec. 16, 2005. The entire contents of each of the above documents is hereby incorporated by reference.

FIELD OF THE INVENTION

The present invention relates to maintenance of elevators and other conveying devices. In particular, the present invention relates to a new and improved method and computer program for optimizing the implementation of a maintenance program for maintenance units.

BACKGROUND OF THE INVENTION

An essential property of elevators and other conveying means for transporting people and goods is reliability of operation. To ensure reliability of operation, various maintenance programs are employed. Maintenance programs are designed to maintain a maximal working capacity of conveying means.

In the following, a maintenance program type that can be used e.g. for elevators is presented by way of example. In determining an appropriate maintenance program, many factors have to be taken into account: manufacturer, elevator type, history data, operating environment, volume of utilization, etc. The maintenance program for an elevator in heavy and frequent use may differ very much from the maintenance program for an elevator in a low-rise apartment house where the elevator is not much used. In the former case, the maintenance program may define maintenance work for each month of the year, whereas in the latter case one or two yearly maintenance visits according to the maintenance program may be sufficient.

Figure 1A:
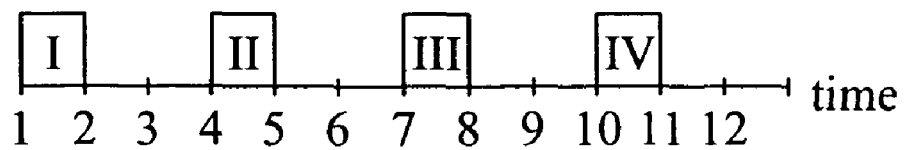
Figure 1B:
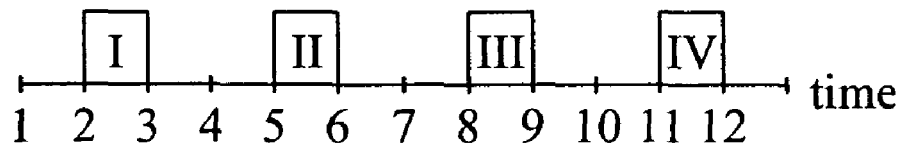
Figure 1C:
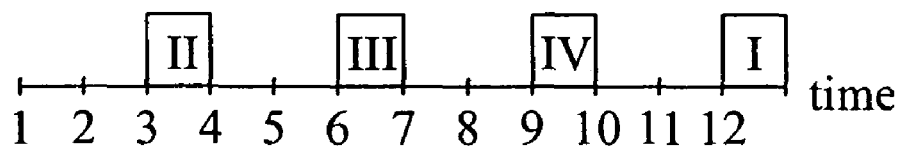

A possible maintenance program concept is of a modular nature. In a modular maintenance program, several maintenance modules differing from each other in content are defined, and these modules are executed at predetermined intervals of time. FIGS. 1a, 1b and 1c present an example of application of a modular maintenance program concept. In the figures, the horizontal axis represents time (month). In this example, the maintenance program for the maintenance object comprises four maintenance modules (I, II, III and IV) differing from each other in respect of content. In FIG. 1a, the maintenance program begins in January, in FIG. 1b in February and in FIG. 1c in December. In other words, the periodic schedule of execution of different maintenance modules is the same in each figure, only the starting month of the maintenance program varies. An example of the principle of modular maintenance program is described in specification U.S. Pat. No. 6,330,935.

For each maintenance module, an estimate of the required amount of work can be determined. The actual maintenance work is carried out by a serviceman whose maintenance domain includes the maintenance module in question.

The maintenance modules (i.e. maintenance tasks included in the maintenance module) can be allocated to each serviceman according to whose domain the maintenance module pertains to. A difficulty in allocation is e.g. the fact that, for instance on an annual scale, there may be as many as 100-300 separate maintenance units pertaining to one serviceman in his own domain. Further, each serviceman generally has a monthly capacity, which indicates the planned amount of work that the serviceman can perform during each month. When the above-described modular maintenance program concept is used, it is required that the starting months of the maintenance programs be so adjusted that the serviceman will be able to perform the maintenance tasks in his domain during each month. In short, the work allocator should be able to allocate maintenance modules to servicemen in such a way that the modules will be executed on time and that each serviceman is not allocated too much or too little maintenance work in individual months. At the same time, the work allocator should be able to maximize the amount of maintenance work to be performed within the limits of the working capacity of each serviceman.

BRIEF DESCRIPTION OF THE INVENTION

The method of the invention is characterized by what is presented in the characterization part of claim 1. The computer program of the invention is characterized by what is presented in the characterization part of claim 5. Other embodiments of the invention are characterized by what is disclosed in the other claims. Inventive embodiments are also presented in the description part and drawings of the present application. The inventive content disclosed in the application can also be defined in other ways than is done in the claims below. The inventive content may also consist of several separate inventions, especially if the invention is considered in the light of explicit or implicit sub-tasks or with respect to advantages or sets of advantages achieved. In this case, some of the attributes contained in the claims below may be superfluous from the point of view of separate inventive concepts. Within the framework of the basic concept of the invention, features of different embodiments of the invention can be applied in conjunction with other embodiments.

According to a first aspect of the present invention, a method for optimizing the implementation of a maintenance program for maintenance units is disclosed. In the method, a number of maintenance units are assigned to a given maintenance domain, and for each maintenance unit a maintenance program is defined which determines for the maintenance unit one or more maintenance modules, which are executed at points of time determined by the maintenance program. According to the invention, an estimated duration is determined for each maintenance module. Further, additionally a periodic working capacity is defined for each serviceman executing maintenance programs, and location data is defined for each maintenance unit.

The maintenance work comprised in the maintenance modules is optimized for each serviceman so as to minimize the unbalance between the working capacity of the serviceman and the amount of maintenance work required by the maintenance units belonging to the maintenance domain attended to by the serviceman while simultaneously minimizing the required traveling from a maintenance unit to another so that the number of maintenance modules located in the vicinity of each maintenance module is maximized. In this way, a situation is reached where, when a serviceman finishes the maintenance work in one maintenance module, there are simultaneously as many possible next maintenance objects in the vicinity as possible. Further, in an embodiment of the invention, at the optimization phase the starting time of the maintenance program of one or more maintenance units is shifted.

In an embodiment of the invention, minimization of unbalance and geographic nearness of maintenance units are emphasized at the optimization stage with certain coefficients. At the optimization stage, e.g. a cost function C, consisting of partial costs $C_1$ and $C_2$, is optimized, wherein:

$$C = \min\{K_1 \cdot C_1 + K_2 \cdot C_2\}, \text{ where}$$

$K_1$ and $K_2$ are coefficients and $$K_1 + K_2 = 1,$$

$$C_1 = \sum_{m \in M} \left( \sum_{e \in E} W_{m,e} - C_m \right)^2,$$

$$C_2 = -\sum_{i \in E} \sum_{j \in E} (i \neq j) \cdot N(d_{i,j}, D_i, s) \cdot S(w^{<i>}, w^{<j>}),$$

where
- m=month comprised in a sequence of months M={January, February, March, .... December},
- $W_{m,e}$=workload matrix for maintenance unit e, which is one of a number of maintenance units that together form a maintenance domain E,
- $C_m$=serviceman's monthly working capacity,
- i=first maintenance unit
- j=second maintenance unit
- $N(d_{i,j}, D_i, s)$=nearness function, which indicates how near to each other i and j are located, where $$N(d_{i,j}, D_i, s) = e^{-\left(\frac{d}{D}\right)^s},$$

where d is the distance of from j, D is the distance of k nearest maintenance units from i and s is a parameter of form for the nearness function, $S(w^{<i>}, w^{<j>})$=synchronization function, where w is a vector which comprises the monthly amount of maintenance work in a device-specific maintenance program.

According to a second aspect of the invention, a computer program for optimizing the implementation of a maintenance program for maintenance units is disclosed, said computer program comprising code adapted to execute the steps contained in the method described above.

The present invention provides the advantage that the maintenance work according to the maintenance program is optimized in such a way that there are always as many next maintenance objects as possible near the one being currently attended to. Thus, the serviceman will not spend any time on unnecessary traveling. At the same time, the optimization sees to it that the serviceman's working capacity can be utilized as effectively as possible.

LIST OF FIGURES

Figure 2:
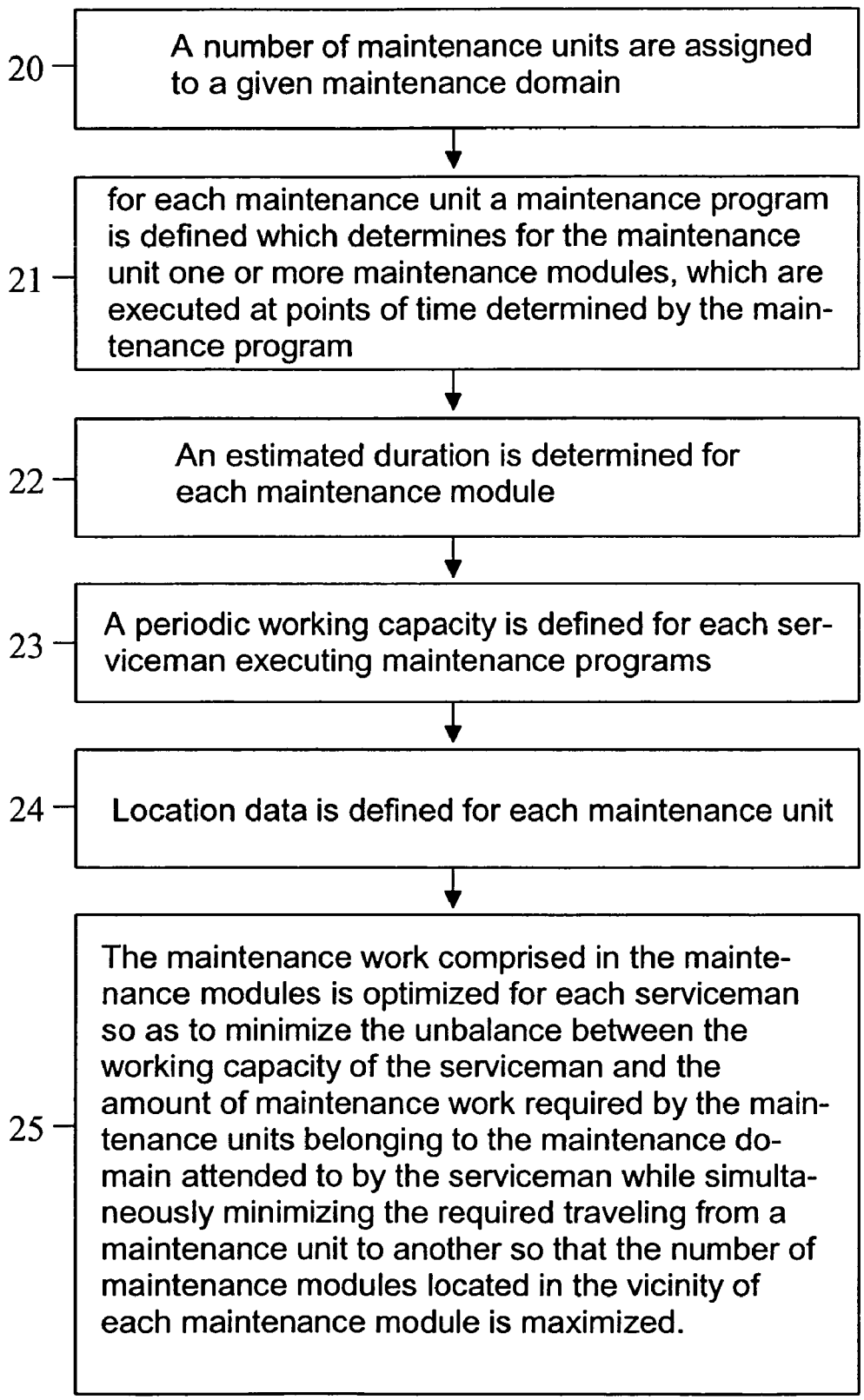
Figure 3:
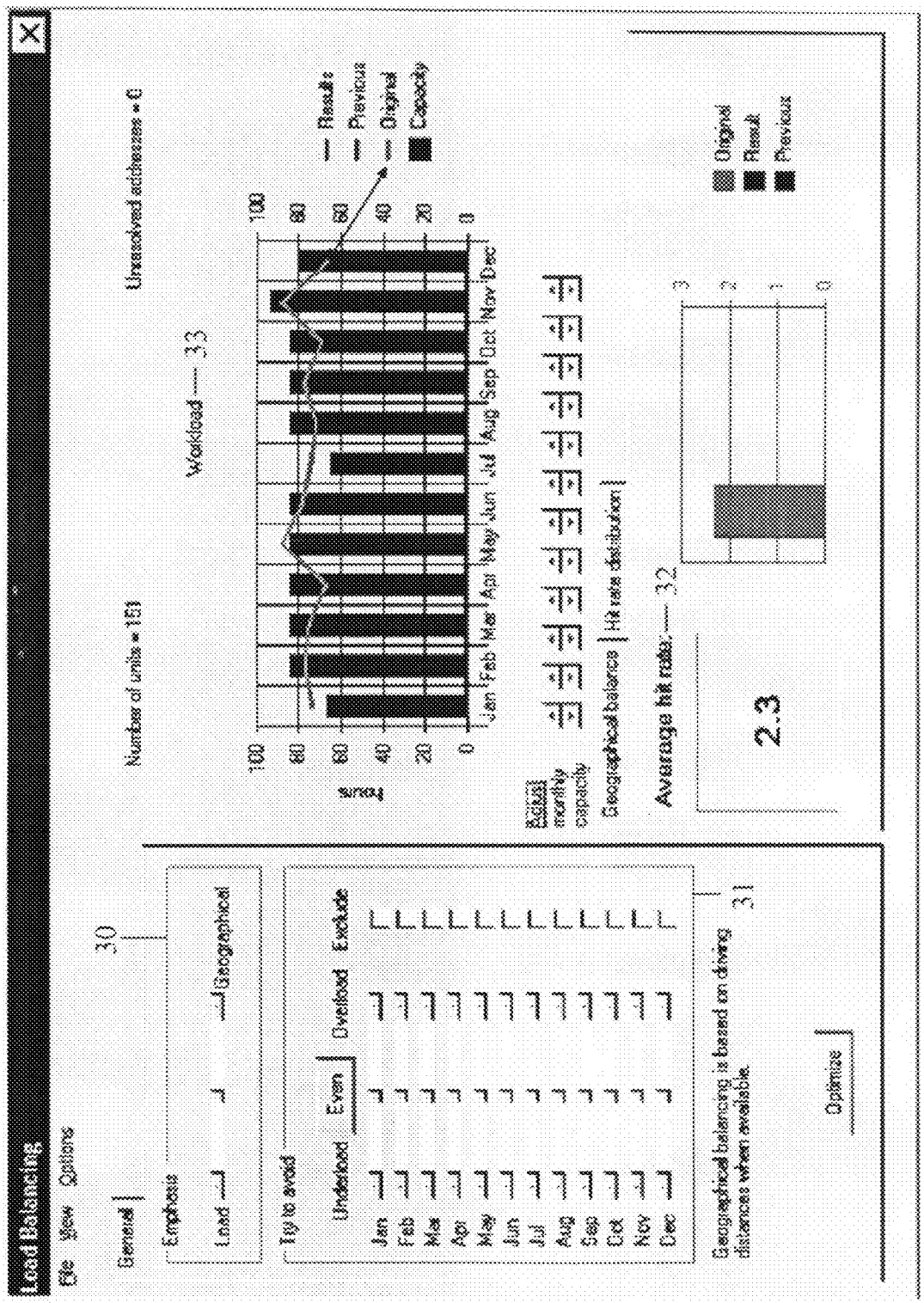
Figure 4:
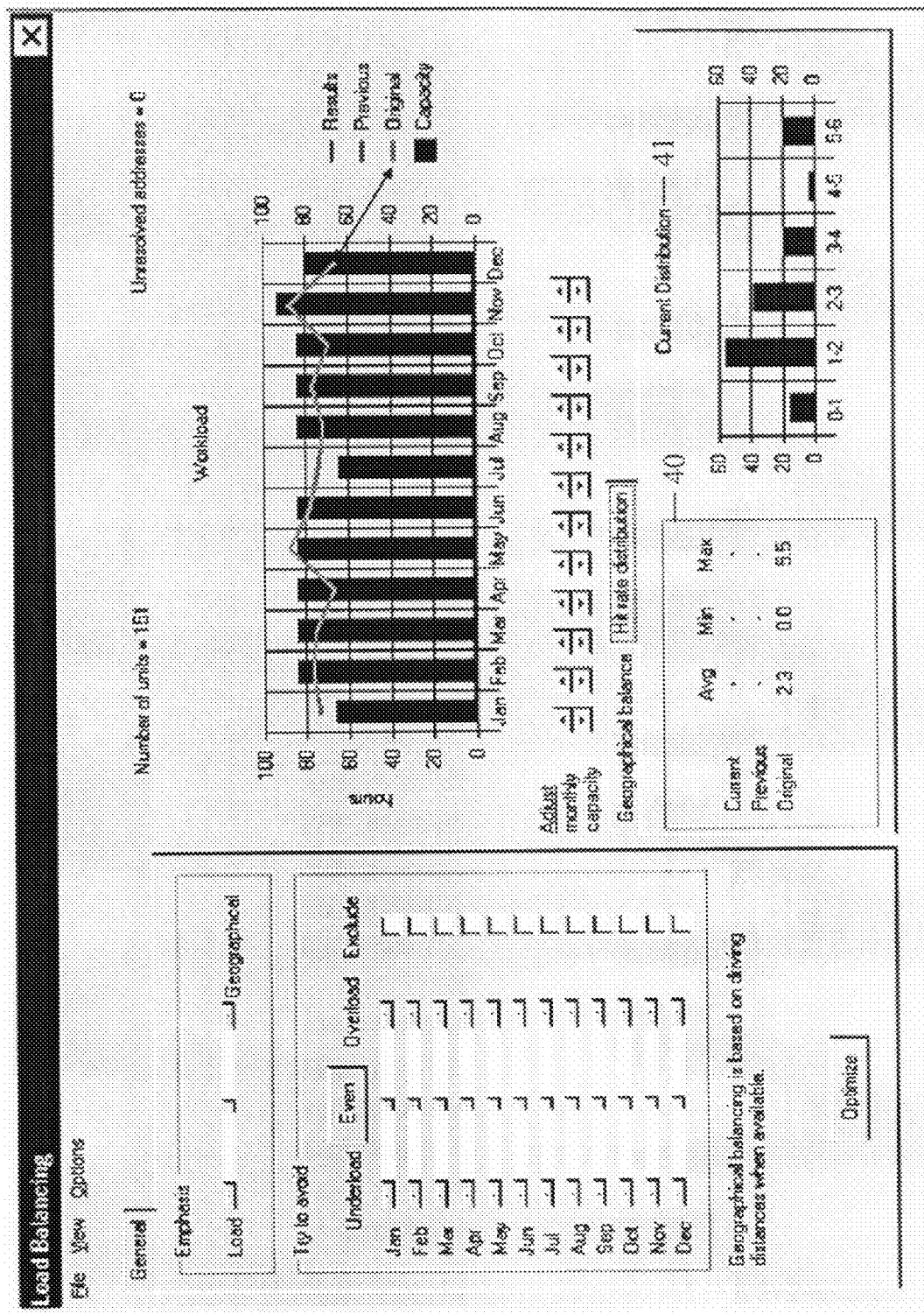
Figure 5:
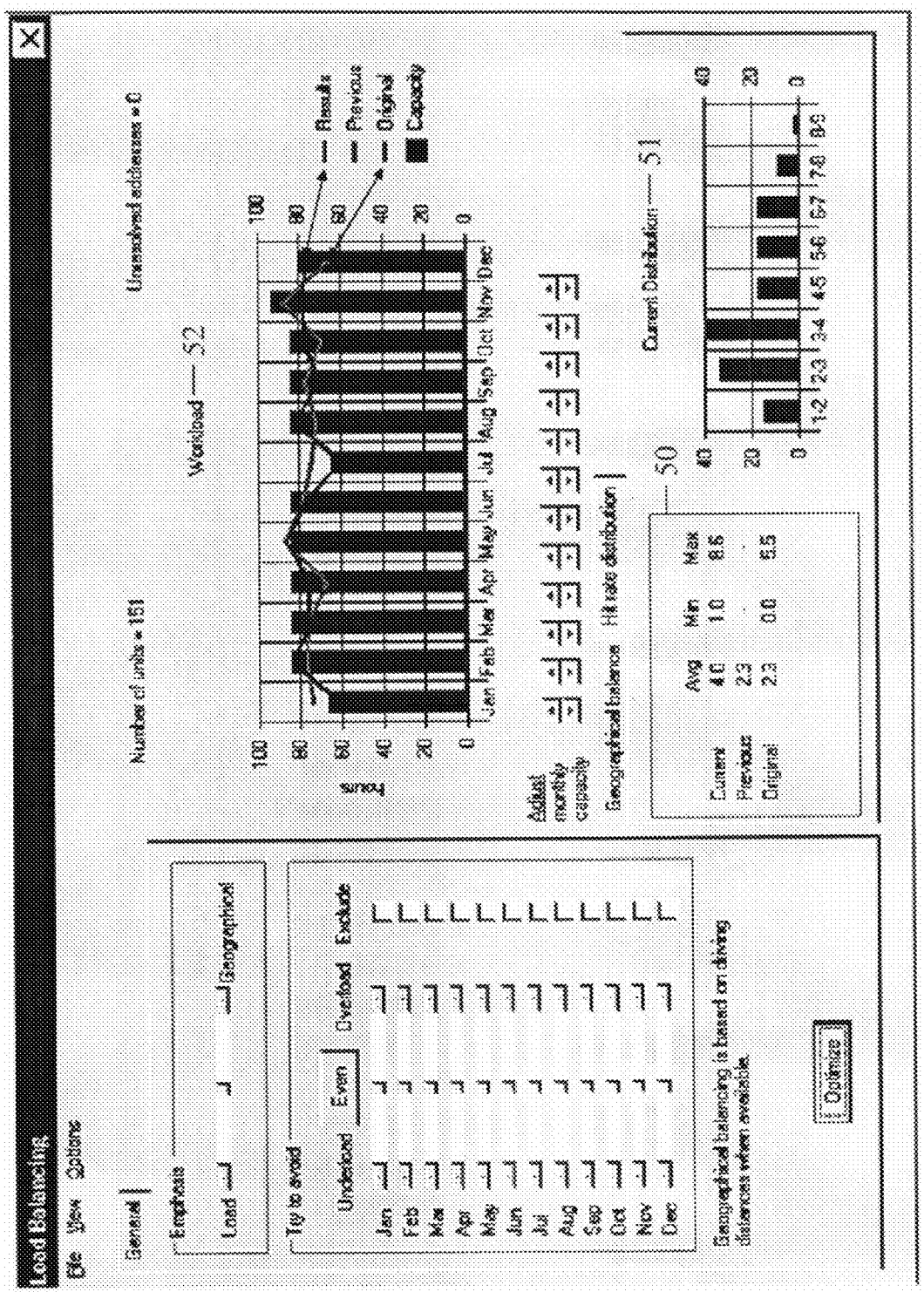
Figure 6:
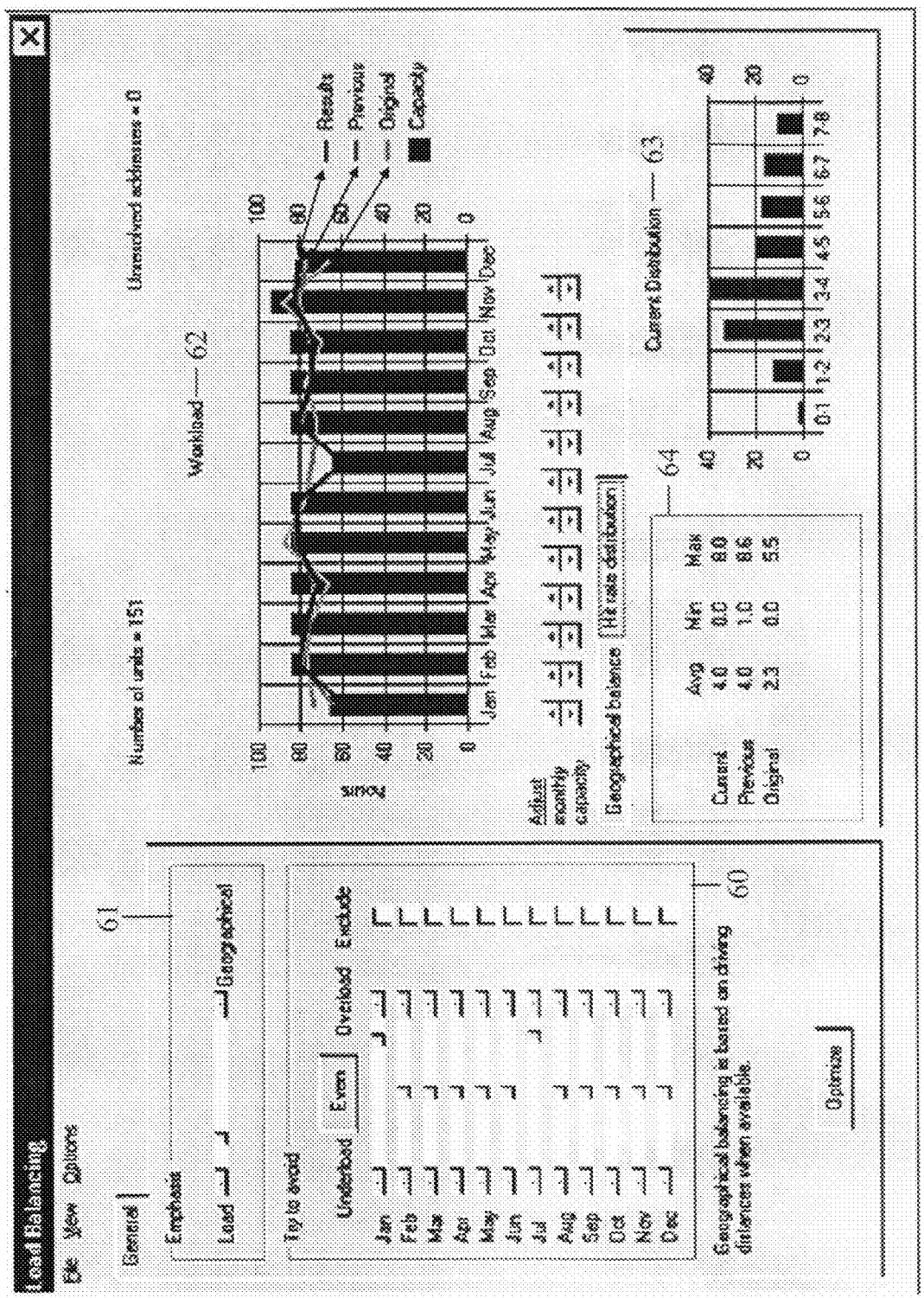

FIGS. 1a, 1b and 1c present a prior-art example of a modular maintenance program concept, FIG. 2 presents a flow diagram of the method of the invention, FIG. 3 presents an example of a window in a computer program according to the invention, FIG. 4 presents a second example of a window in a computer program according to the invention, FIG. 5 presents a third example of a window in a computer program according to the invention, and FIG. 6 presents a fourth example of a window in a computer program according to the invention.

DETAILED DESCRIPTION OF THE INVENTION

FIG. 2 is a flow diagram representing the basic operation of the method of the invention. In the method, the implementation of the maintenance program for maintenance units is optimized in the manner described in greater detail below. Before the optimization, a number of maintenance units are assigned to a given maintenance domain, step 20. For each maintenance unit, a maintenance program is defined which determines for the maintenance unit one or more maintenance modules, which are to be executed at points of time determined by the maintenance program, step 21. 'Maintenance program' refers e.g. to a modular maintenance program as described above. For each maintenance module, an estimated duration is determined, step 22. The estimated duration is defined using e.g. the average duration of earlier overhauls comprised in the maintenance modules. Further, for each serviceman carrying out maintenance programs, a periodic working capacity is determined, step 23. The term 'periodic' preferably refers to a monthly working capacity. However, it is obvious that it may refer to a period of time of any other length. In step 24, location data is determined for each maintenance unit. The location data is preferably represented by longitudinal and latitudinal coordinates.

According to step 25, the maintenance work comprised in the maintenance module is optimized for each serviceman by minimizing the unbalance between the working capacity of the serviceman and the amount of maintenance work required by the maintenance units belonging to the maintenance domain attended to by the serviceman and at the same time minimizing the required traveling from a maintenance unit to another by maximizing the number of maintenance modules located in the vicinity of each maintenance module.

FIG. 3 presents an example of a window in a computer program according to the invention. The method disclosed in the invention is preferably implemented as a computer program which optimizes the implementation of the maintenance program for the maintenance units.

For the optimization, certain initial data have been input to or are accessible by the computer program:
- a number of maintenance units are assigned to a given maintenance domain,
- for each maintenance unit, a maintenance program has been defined, which determines for the maintenance unit one or more maintenance modules to be executed at points of time determined by the maintenance program,
- for each maintenance module, an estimated duration (i.e. a default length of time taken by the maintenance work) is determined, and
- for each serviceman implementing maintenance programs, a monthly working capacity is defined.

The concept 'maintenance domain' specifies a number of devices (maintenance units), e.g. elevators, escalators and automated doors, which are to be maintained in accordance with the maintenance program. For different elevators, the actual technical content of the maintenance program may be the same, but maintenance profiles are different. The concept 'maintenance profile' tells the actual time scheduling of the maintenance program (for example, FIGS. 1a, 1b and 1c present three maintenance profiles). In respect of implementation of the invention, it is inessential whether the device to be maintained is an elevator or some other maintenance object.

By the implementation described, the workload produced by the maintenance domain is balanced in relation to the working capacity of the serviceman attending to the maintenance domain. At the same time, care is taken to ensure that there are in the vicinity of the maintenance unit being worked on as many other maintenance units requiring maintenance according to the maintenance program as possible.

The optimization can be carried out by minimizing e.g. a cost function C as presented below. It consists of partial costs $C_1$ and $C_2$, where $C_1$ is a calendar-based cost factor and $C_2$ is a cost factor relating to the geographic location of maintenance units. The equation for the cost function C is $$C = \min\{K_1 \cdot C_1 + K_2 \cdot C_2\}, \quad (1) \text{ where}$$

$K_1$ and $K_2$ are coefficients and $$K_1 + K_2 = 1,$$

$$C_1 = \sum_{m \in M} \left(\sum_{e \in E} W_{m,e} - C_m\right)^2,$$

$$C_2 = -\sum_{i \in E} \sum_{j \in E} (i \neq j) \cdot N(d_{i,j}, D_i, s) \cdot S(w^{<i>}, w^{<j>}),$$

where
- m=month comprised in a sequence of months M={January, February, March, .... December},
- $W_{m,e}$=workload matrix for maintenance unit e, which is one of a number of maintenance units that together form a maintenance domain E,
- $C_m$=serviceman's monthly working capacity. $C_m$ is e.g. a 12-element vector, whose values are obtained by emphasizing the planned working capacity by pre-emphasis factors (FIG. 2, reference 31)
- i=first maintenance unit
- j=second maintenance unit
- $N(d_{i,j}, D_i, s)$=nearness function, which indicates on a scale of 0 ... 1 how near to each other i and j are located, where $$N(d_{i,j}, D_i, s) = e^{-\left(\frac{d}{D}\right)^s},$$

where d is the distance of i from j, D is the average distance of k, e.g. ten nearest maintenance units from i (k is an adjusting parameter whose value is found by trying), and s is a parameter of form for the nearness function, and $S(w^{<i>}, w^{<j>})$=synchronization function, where w is a vector which contains the monthly amount of maintenance work in a device-specific maintenance program.

Distance D can be expressed in at least three different ways: (1) distance between two devices as the crow flies, (2) distance between two devices by road and street, or (3) distance between two devices translated into travel time. In the actual optimization, any one of the above distance expressions may be used. In the actual calculation of distances, any appropriate method may be used.

The nearness function N is used to correlate the distance between devices i and j (and the maintenance modules of devices i and j) in relation to the average distance D of k devices nearest to device i. The longer the distance of device i from another device j, the closer to zero is the value of N. Correspondingly, as the distance between devices i and j approaches zero, the value of N approaches the value one.

On the whole, the purpose of cost function $C_1$ in optimization is to minimize the difference between the serviceman's capacity and the workload produced by the maintenance modules, and the purpose of cost function $C_2$ is to maximize the amount of other possible maintenance work located near the maintenance work to be carried out at a given maintenance unit i.

Section 30 in FIG. 3 shows that the emphasis between the workload and the geographical factor (terms $C_1$ and $C_2$) can be set at a desired point (coefficients $K_1$ and $K_2$ in equation 1). Similarly, in section 31, the monthly workload planned for the serviceman can be adjusted by pre-emphasis factors which are set before performing the optimization. Section 32 in the window represents a maintenance domain with 151 different devices (e.g. elevators and/or escalators) allocated to it. The workload diagram 33 shows that, based on the material forming the basis of the calculations, the serviceman's working capacity e.g. in January and July is not sufficient for him to cope with the allocated maintenance work. A nearness value 32 indicates how many other possible maintenance units (devices) on an average exist near each individual device. In the window presented in FIG. 3, the average number of other devices located near each individual device is 2.3.

FIG. 4 provides somewhat more information to the window in FIG. 3. Table 40 presents more detailed information as to what are the extremities of the distribution of maintenance units. Near an individual device there are about 2.3 other devices for which a maintenance module according to the maintenance program exists in the period being considered. There are several devices with no other device needing maintenance in the neighborhood. Further, near one device there are a maximum of 5.5 other devices requiring maintenance work at the same time. The distribution 41 provides more detailed information as to which category each device belongs to as measured by the nearness value. For instance, the distribution 41 shows that in the range 2-3 there are just below 40 devices. In other words, in the case of 40 devices the situation is such that near the device there are two or three other devices needing maintenance.

FIG. 5 represents the situation after the optimization step. In other words, in the situation presented in FIG. 5, the maintenance work comprised in the maintenance modules is optimized for each serviceman so that the unbalance between the working capacity of the serviceman and the amount of maintenance work required by the maintenance units pertaining to the maintenance domain attended to by the serviceman is minimized and the required traveling from a maintenance unit to another is minimized, so that the number of maintenance modules located in the neighborhood of each maintenance module is maximized. From the workload diagram 52 it can be seen that the serviceman's working capacity and the amount of work allocated to the serviceman correlate better in the situation represented by FIG. 3. In addition, the table 50 and distribution 51 show that the average nearness value has increased (2.3->4.0). As compared to the situation presented in FIG. 2, more and more devices have in their vicinity a larger number of other devices needing maintenance. Moreover, it is worth noticing that, after the optimization, there is in the vicinity of each maintenance object at least one other maintenance object on which the serviceman can continue his work. Also, the maximum value in table 50 has increased considerably (5.5->8.6) from the non-optimized situation.

FIG. 6 presents a situation where the emphasizing described in connection with 3 has been changed. In FIG. 6, the emphasis between the workload and the geographical factor has been shifted towards the workload. In addition, the monthly emphases on workload (January and July) have been changed as compared to the previous figures.

The computer program disclosed in the present invention or a part of it may be stored in a single memory area or it may consist of several memories or memory portions which contain e.g. RAM memory (RAM, Random Access Memory) or ROM memory (ROM, Read Only Memory), and which, when executed in a processor, carries out at least one of the steps of the method disclosed in the present invention. The memory may additionally contain other applications or software components, which are not described here in detail.

The invention is not exclusively limited to the above-described embodiment examples, but many variations are possible within the scope of the inventive concept defined in the claims.

The invention claimed is:

1. Method for optimizing the implementation of a maintenance program for maintenance units, said method comprising the steps of:
  assigning a number of maintenance units to a given maintenance domain;
  defining for each maintenance unit a maintenance program, which determines for the maintenance unit one or more maintenance modules, which are executed at points of time determined by the maintenance program;
  determining an estimated duration for each maintenance module;
  determining a periodic working capacity for each serviceman carrying out maintenance programs;
  determining location data for each maintenance unit; and
  optimizing, with a processor, the maintenance work comprised in the maintenance modules for each serviceman so that at the optimization stage a cost function C is minimized, said function consisting of partial costs $C_1$ and $C_2$, wherein:
  $C=\min\{K_1 \cdot C_1 + K_2 \cdot C_2\}$, where
  $K_1$ and $K_2$ are coefficients and $K_1+K_2=1$, $$C_1 \sum_{m \in M} \left( \sum_{e \in E} W_{m,e} - C_m \right)^2,$$
  $$C_2 = -\sum_{i \in E} \sum_{j \in E} (i \neq j) \cdot N(*) \cdot S(w^{<i>}, w^{<j>}), \text{ where}$$

m=period, preferably month comprised in a sequence of months M={January, February, March, .... December},
  $W_{m,e}$=workload matrix for maintenance unit e, which is one of a number of maintenance units that together form a maintenance domain E,
  $C_m$=serviceman's periodic working capacity,
  i=first maintenance unit
  j=second maintenance unit
  N(*)=nearness function indicating how near to each other i and j are located, thus the value of N(*) approaches zero as the distance of i from j becomes longer and one as the distance of i from j becomes shorter,
  $S(w^{<i>}, w^{<j>})$=synchronization function, where w is a vector which comprises the periodic amount of maintenance work in the maintenance program.

2. Method according to claim 1, wherein the method further comprises the step of:
  shifting at the optimization stage the starting point of time of the maintenance program for one or more maintenance units.

3. Method according to claim 1 or 2, wherein at the aforesaid optimization stage, nearness function N(*) corresponds to:

$$N(d_{i,j}, D_i, s) = e^{-\left(\frac{d}{D}\right)^s},$$

where d is the distance of i from j, D is the distance of k nearest maintenance units from i and s is a parameter of form for the nearness function.

4. A non-transitory computer readable medium having embodied thereon a computer program for optimizing the implementation of a maintenance program for maintenance units, said computer program comprising code adapted to perform the following steps when they are executed in a data processing device:
  assigning a number of maintenance units to a given maintenance domain;
  defining for each maintenance unit a maintenance program, which determines for the maintenance unit one or more maintenance modules which are implemented at points of time determined by the maintenance program;
  determining an estimated duration for each maintenance module;
  determining a periodic working capacity for each serviceman carrying out maintenance program;
  determining location data for each maintenance unit; and
  optimizing the maintenance work comprised in the maintenance modules for each serviceman so that at the optimization stage, a cost function C is minimized, said function consisting of partial costs $C_1$ and $C_2$, wherein:
  $C=\min\{K_1 \cdot C_1 + K_2 \cdot C_2\}$, where
  $K_1$ and $K_2$ are coefficients and $K_1+K_2=1$, $$C_1 \sum_{m \in M} \left( \sum_{e \in E} W_{m,e} - C_m \right)^2,$$
  $$C_2 = -\sum_{i \in E} \sum_{j \in E} (i \neq j) \cdot N(*) \cdot S(w^{<i>}, w^{<j>}), \text{ where}$$

m=period, preferably month comprised in a sequence of months M={January, February, March, .... December},
  $W_{m,e}$=workload matrix for maintenance unit e, which is one of a number of maintenance units that together form a maintenance domain E,
  $C_m$=serviceman's periodic working capacity,
  i=first maintenance unit
  j=second maintenance unit
  N(*)=nearness function indicating how near to each other i and j are located, thus the value of N(*) approaches zero as the distance of i from j becomes longer and one as the distance of i from j becomes shorter,
  $S(w^{<i>}, w^{<j>})$=synchronization function, where w is a vector which comprises the periodic amount of maintenance work in the maintenance program.

5. Non-transitory computer readable medium according to claim 4 wherein the computer program further comprises code adapted to perform the following step when they are executed in a data processing device:
  shifting at the optimization stage the starting point of time of the maintenance program for one or more maintenance units.

6. Non-transitory computer readable medium according to claim 4 or 5, wherein at the aforesaid optimization stage, nearness function N(*) corresponds to:

$$N(d_{i,j}, D_i, s) = e^{-\left(\frac{d}{D}\right)^s},$$

where d is the distance of i from j, D is the distance of k nearest maintenance units from i and s is a parameter of form for the nearness function.

* * * * *